United States Patent [19]
Crehore

[11] 4,184,084
[45] Jan. 15, 1980

[54] WIND DRIVEN GAS GENERATOR

[76] Inventor: Robert Crehore, 20661 McClellan, Cupertino, Calif. 95014

[21] Appl. No.: 880,808

[22] Filed: Feb. 24, 1978

[51] Int. Cl.² .................................................. F03B 13/00
[52] U.S. Cl. ........................................ 290/55; 290/44
[58] Field of Search ................. 416/111, 119; 240/44, 240/55; 310/268

[56] References Cited
U.S. PATENT DOCUMENTS

| | | | |
|---|---|---|---|
| 3,484,617 | 12/1969 | Winsel | 290/55 X |
| 3,648,360 | 3/1972 | Tucker | 310/268 X |
| 3,754,147 | 8/1973 | Hancock et al. | 290/1 X |
| 4,095,422 | 6/1978 | Kurakake | 416/119 X |
| 4,119,863 | 10/1978 | Kelly | 290/55 |

Primary Examiner—Gene Z. Rubinson
Assistant Examiner—W. E. Duncanson, Jr.
Attorney, Agent, or Firm—Wm. T. Metz

[57] ABSTRACT

This invention provides a means to convert wind energy into electrical energy which through electrolysis forms gases to be stored under pressure, giving a form of stored energy for use at some future time by the use of a high torque, low speed vertical axis wind machine connected by direct drive to homopolar direct current generators so as to create direct current for the electrolysis of water, resulting in the breakdown of water into its basic components of hydrogen and oxygen, which are then stored under pressure until necessary for use as a source of energy.

6 Claims, 9 Drawing Figures

WIND DRIVEN GAS GENERATOR

BACKGROUND OF THE INVENTION

1. Field of the Invention

This invention pertains to gas generating devices with their principal source of energy being the wind. The gas generated is stored as opposed to the system of converting wind energy to electrical energy in which the storage of the electrical energy is a relatively difficult and an uneconomical procedure.

As a fuel, hydrogen is not the most obvious selection among the fuels on earth. Its heating value is approximately 274 Btu. per cubic foot at standard conditions, as compared to methane at 1050 Btu. per cubic foot, standard conditions, or with fossil fuels in liquid or solid form at heating values many times that of hydrogen. However, hydrogen does have two unique characteristics which bring it into proper focus as a fuel; that is, quantity and reversibility. Hydrogen is one of earth's most abundant elements. When used as a fuel, hydrogen combines with oxygen to form water, and is thus a reversible fuel, since hydrogen can again be produced from water by means of electrolysis. Thus hydrogen is also an inexhaustible fuel, and is non-toxic to living organisms. The electrolysis of water has the advantages of the widespread availability of water; and that the absence or presence of pressure makes little or no difference to the process of electrolysis, nor in the energy requirements for electrolysis. Thus, because of the relatively free compression of gases without the further expenditure of energy, it is possible to store gaseous energy in a relatively concentrated form. At 200 atmospheres, hydrogen with 274 Btu. per cubic foot, standard conditions, will occupy about 142 cubic centimeters.

The ability to form gases by electrolysis at wind velocities as low as 1.8 meters per second is necessary because wind velocities around much of the world average a little over 4 meters per second. To be useful, a device to convert wind energy into stored gases by means of electrolysis must be functional well beyond this average. Electrolysis requires direct current electricity at a minimum of 2.5 volts potential available at the electrolyte, but at a high amperage, since the electrical quantity of 96,500 ampere-seconds produces only 1 gram of a substance by electrolysis according to Faraday's Law, which is about equal to 460 Btu, a very low amount in terms of fuel requirements. Low wind velocities or wind pressures require low electrical drag in core losses, counter-electromotive forces, and low mechanical losses from brushes or speed changers. Homopolar electrical generating machines generate voltage according to the formula: $e = Blv$, where $e$ is the voltage, $B$ the density of lines of magnetic force per unit area, $l$ the length of the conductors, and $v$ the velocity of the conductors across the lines of force. In addition to meeting the minimum voltage requirement, the low drag and low wind velocities requirements, the homopolar generator also adds another important and redeeming feature to this invention, which is its shape. This machine can be made into a disc, which fits admirably well into the scheme of things from several design points of view. The primary disadvantage of the homopolar machine are the large brush losses in potential. At low speeds, which is a factor of voltage output, a loss of nearly one volt per brush requires series brush connections, and huge size. Shipping considerations tend to limit the size, so that conductors have been lengthened by giving them spiral shapes on the surface of the disc, as well as employing both sides on the disc armature to carry conductors, in order to offset the problems of obtaining a high enough voltage at low wind velocities to send a current through the electrolyte. These special configurations of a homopolar generator result in a novel design of a homopolar generator to be used in the wind driven gas generator.

The ability to convert and store wind energy at relatively high wind velocities, in a practical matter relating to the fact that, with the process of electrolysis also capable of accepting the higher voltages accruing from greater wind speeds according to the formula above, and the fact that higher wind speeds create a need for more heat due to the wind's cooling effect, a device of this sort, to be useful, ought to supply its end-product in the greatest quantity during the times of greatest need. The configuration of the wind driven element disclosed herein permits operation at high wind speeds because the mechanical components move at velocities less than that of the wind. Due to stresses induced by centrifugal forces, mechanical components and materials have a practical velocity limitation of about 77 meters per second. It will be remembered that a wind speed of 100 miles per hour, a rare, but not unknown occurence, is a wind speed of less than 45 meters per second, and from the above, the mechanical components of this machine move at velocities less than that of the wind. Therefore, the device as represented herein does not need to have, nor does it have, a speed limiting mechanism of any sort. This difference, of mechanical elements subject to speeds greater than windspeed, versus mechanical elements subject only to speeds at or less than windspeed, is a significant divide, or difference, with regard to service range. This difference also represents the novelty of the invention over the known foil-shaped propeller blade wind devices.

2. Description of the Prior Art

Heretofore hydrogen and oxygen gases have been formed by electrolysis with the necessary electrical energy furnished by wind energy. However, none of the prior art discloses a means to form hydrogen and oxygen at nearly all windspeeds and to obtain maximum efficiency from the wind machine and gas generator at nearly all windspeeds. The following U.S. Pat. Nos. are, in the opinion of the inventor and upon advice of counsel, the closest prior art of which the inventor is aware:

Winsel 3,484,617
Carter 3,793,530
Grossman 4,055,950
Germain 4,058,979

As can be seen by reference to the prior art disclosed above, and as a matter of general knowledge to the inventor, no means of converting wind energy to stored gases is disclosed which requires no speed governor and which uses direct drive from the wind machine to the gas generator.

SUMMARY OF THE INVENTION

It is, therefore, an object of this invention to provide a wind driven gas generator which will convert wind energy into electrical energy so as to form hydrogen and oxygen which may be separately stored at up to 200 atmospheres of pressure.

It is a further object of this invention to provide a wind driven gas generator which will convert wind energy into electrical energy so as to form gases by electrolysis at wind velocities as low as 1.8 meters per second (four miles per hour).

It is a further object of this invention to provide a wind driven gas generator which will convert wind energy into electrical energy so as to form gases by electrolysis at wind velocities as high as one hundred miles per hour.

It is a further object of this invention to provide a wind driven gas generator in a basic form which may be altered by adding wind driven units with electrical generating units to increase the gas generating capacity without the expense and space requirements of adding another entire unit.

Further objects and advantages of this invention will become apparent from the following drawing, description and claims:

DESCRIPTION OF THE PREFERRED EMBODIMENT

Figure 1:
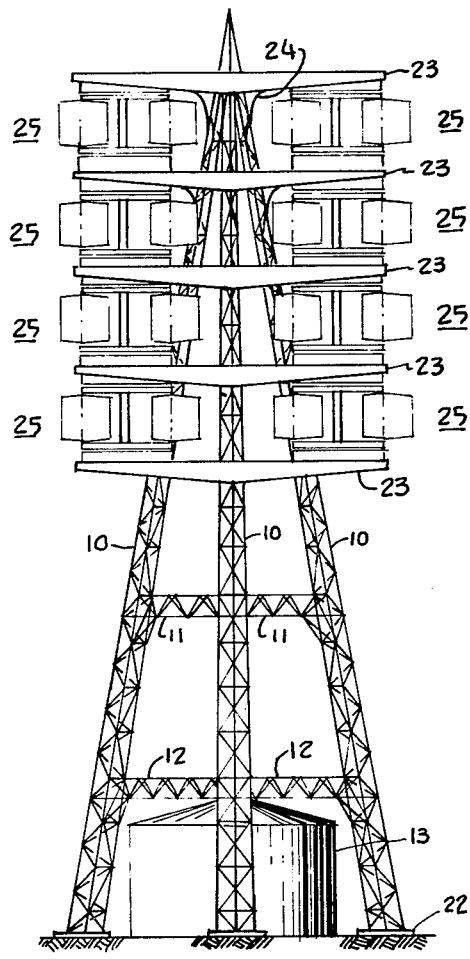
FIG. 1 is a front view of the wind driven gas generator.
Figure 2:
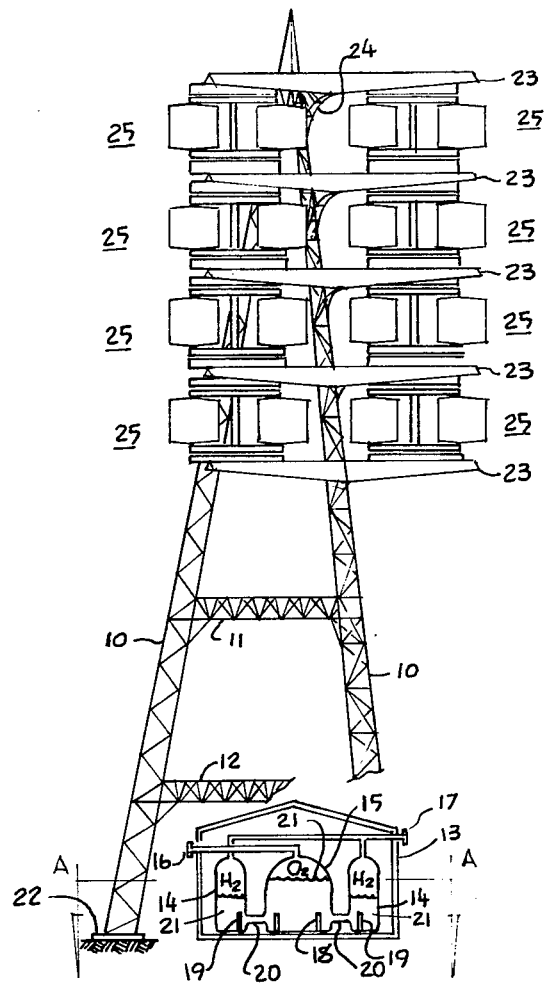
FIG. 2 is a side view of the wind driven gas generator, with the legs and lower braces cut away to show a sectional view of the electrolysis enclosure.
Figure 3:
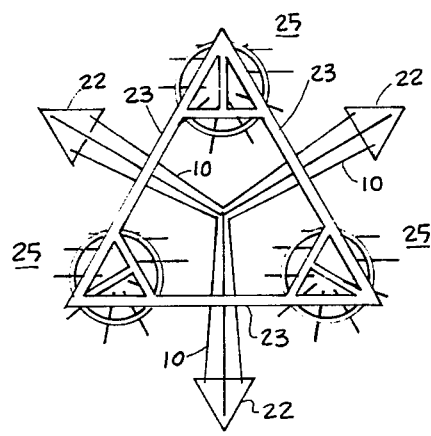
FIG. 3 is a top view of the wind driven gas generator.
Figure 4:
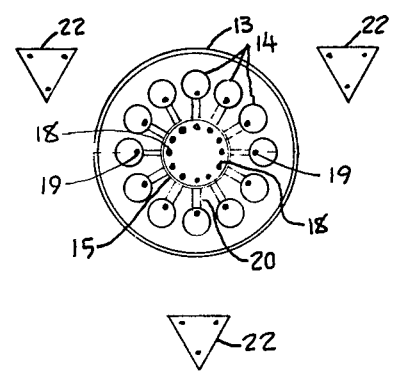
FIG. 4 is a sectional view taken on lines A—A of FIG. 2.

As shown in FIG. 1, the main support structure is a tripod and consists of three legs 10 joined at the top, and fastened to the ground to pedestals 22 by conventional means. Separating the legs 10, and cross-bracing them, are upper braces 11 and lower braces 12. In FIG. 2, the legs 10 and lower braces 12 are cut away to more clearly show a sectional view of the electrolysis enclosure 13, which houses several hydrogen bottles 14, a central oxygen drum 15, an oxygen takeoff 16, a hydrogen takeoff 17, anodes 18 in the oxygen drum 15, and cathodes 19 in the hydrogen bottles 14. Interconnecting passages 20 between oxygen drum 15 and hydrogen bottles 14 allow an ion path through the electrolyte 21 to exist between nearest pairs of oppositely poled anodes 18 and cathodes 19. In both FIG. 1 and FIG. 2, five support arm assemblies 23 are shown, essentially an equilateral triangle shown on edge. Attachment of support arm assemblies 23 to the main support structure 10 is by support attachments 24. Between each support arm assembly 23 exists a vertical space which, at the extremities of the equilateral triangles formed by support arm assemblies 23, is occupied by twelve wind driven elements 25 and twentyfour homopolar electrical generators 40 in the fully complemented array shown. The function of support arm assemblies 23 is to fix both ends of the rotational axes of all wind driven elements 25 and homopolar electrical generators 40 in essentially rigid support from the ground.

The sectional view of the electrolysis cells of the fully complemented gas generator in FIG. 2 shows an electrolysis enclosure 13 having hydrogen bottles 14, twelve in number, arranged as satellites around the central oxygen drum 15, interconnecting passages 20, anodes 18, and cathodes 19.

Figure 5:
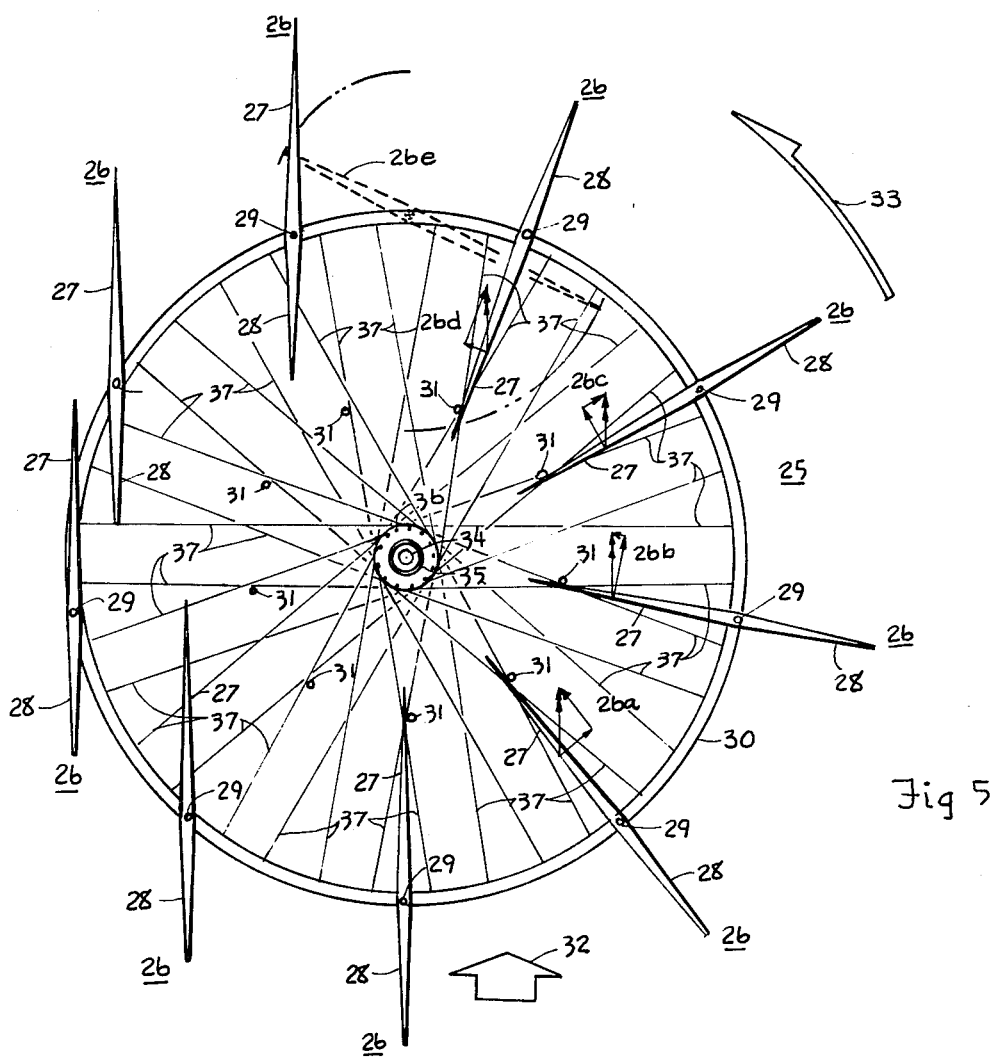
FIG. 5 is an enlarged sectional view taken across one of the wind driven elements of FIG. 1, showing only the vertical elements.
Figure 6:
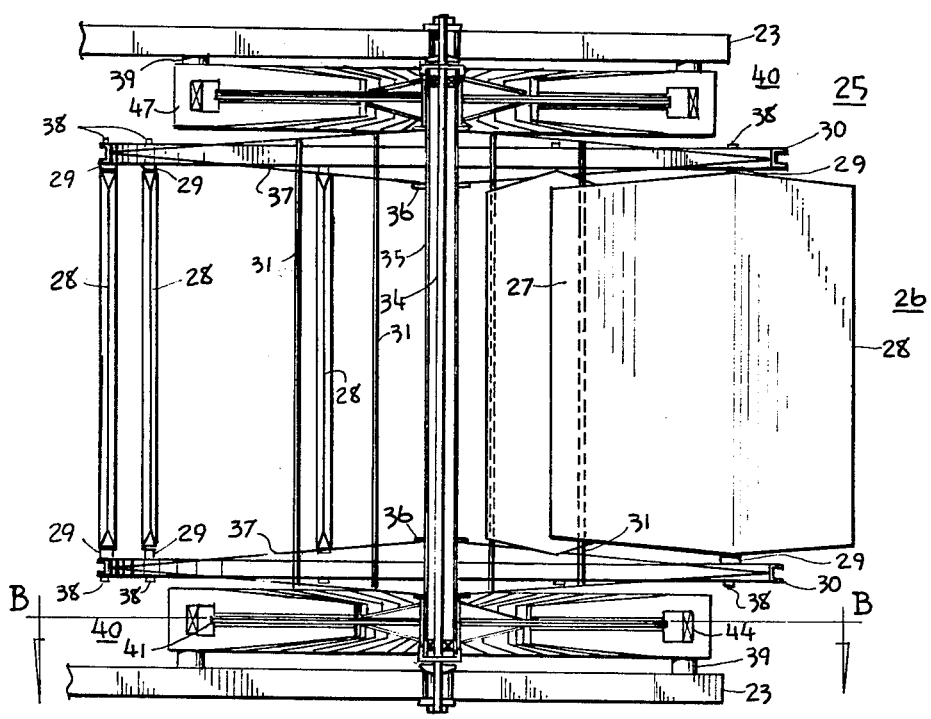
FIG. 6 is an enlarged sectional view taken along the axis of rotation of one of the wind driven elements of FIG. 1.

As shown in FIG. 5, nine vanes 26 are equally disposed along the circumference of rim 30. FIG. 6 shows two rims 30, connected by pivots 29, which are secured at either end to rims 30 by fastening means 38. Pivots 29 allow the vanes 26 to swing about the pivots 29 until vanes 26 contact stops 31 radially arranged between rotational axis 34 and pivots 29. The vanes 26 are composed of a smaller leading area 28 and a larger trailing area 27, divided by pivot 29. About the rotational axis 34 is bearingly mounted tube 35 having suitable disposed flanges 36 arranged longitudinally thereon. Spokes 37 connect and support rims 30 to tube 35 through flanges 36 in a fashion similar to bicycle wheels, such that rims 30 are more or less rigidly spaced therefrom, but fixed to tube 35.

In FIG. 5, the direction of the wind is indicated by arrow 32. Unequal torque is exerted on pivots 29 by the more or less constant unit area pressure of the wind and by virtue of the unequal vane areas 27 and 28, such that the larger surface controls the attitude of the entire vane 26. Diagrams 26a, 26b, 26c and 26d represents the wind direction as a resultant force acting on the surface of each vane 26, and the resultant force is vectored into two component forces, one parallel to the general surface of the vane 26 at any given position, and the other force at right angles to the plane of the vane 26. The resultant force causes rotation of the wind driven element 25 in the direction of the arrow 33. The larger vane area 27 controls the attitude of the entire vane 26. Wind pressure thus maintains the vane 26 against the stop 31 until the wind driven element 25, rotating in the direction of the arrow 33, moves each of the vanes 26 into the eye of the wind and past, so that the force of the wind then acts on the other side of the vane 26, pushing the vane 26 away from the stop 31 instead of against it. At that point, the vane 26 begins to swing as is shown by the dotted lines of 26e, again controlled by the larger area 27, about its respective pivot 29, until the vane assumes a neutral position with respect to wind direction, that is, wind forces are balanced on either side of the vane 26, and with the smaller vane area 28 upwind of the pivot 29, the larger area 27 downwind, or trailing the pivot 29.

As the wind continues to rotate the wind driven element 25 in the direction of the arrow 33, pivots 29 and their respective vanes 26 are carried around into the eye of the wind again, presenting very little resistance or drag as the vanes 26 move against the direction of the wind, by virtue of the narrow areas of the leading edges of smaller vane areas 28 representing thhe only forces opposing rotation. When the trailing areas 27 of vanes 26 again contact stops 31, the vanes 26 are prevented from further swing about pivots 29, the pressure of the wind again aids rotation, at a speed less than that of the wind, due to mechanical drag and wind slippage along the planes or surfaces of the wind vanes 26.

A plurality of supports 39 as shown in FIG. 6 are attached to support arm assemblies 23, and to homopolar electrical generators 40. The portion of the homopolar electrical generator 40 that will rotate is armature disc assembly 41, which is fixedly secured to the tube 35, and which turns at some speed less than that of the wind, identical to the speed of the wind driven element 25.

The field element 40a of the homopolar electrical generator 40 consists of two steel disc-shaped poles 42 and 43, which have fins 47a welded to them for rigidity, field coil housing 47, and a field coil 44 to maintain flux density across air gaps 45. Magnetic lines of force bridging the space between the poles 42 and 43 are illustrated by the arrows 46.

Figure 7:
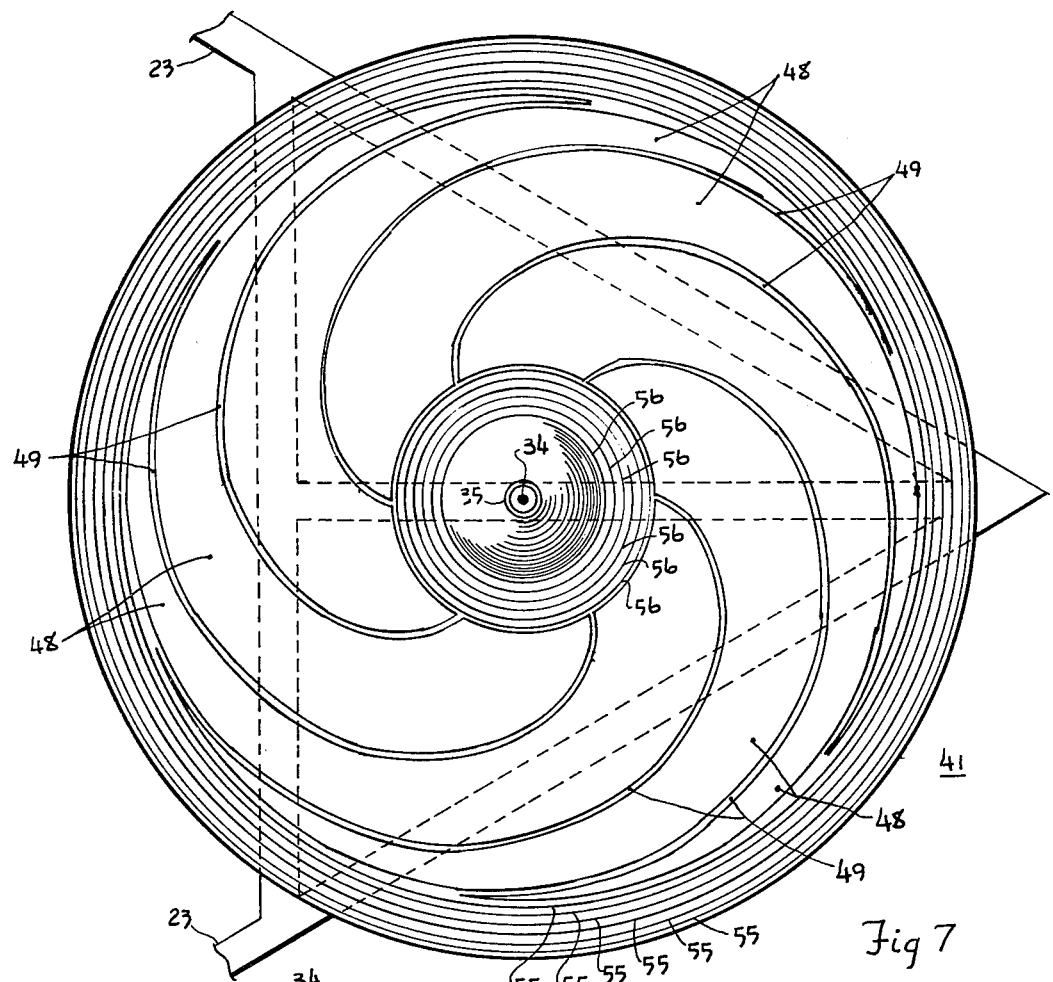
FIG. 7 is an enlarged sectional view taken on lines B—B of FIG. 6.

Armature disc assembly 41 consists of laminations of different materials. Center support disc 52, central cones 53, outer support discs 54 are of rigid, non-ferrous material. Insulator 49 is a bedding cement. Conductors 48 are of copper. Outer slip ring insulators 50, and inner slip ring insulators 51 are of plastic or rubber. As shown in FIG. 7, there are a plurality of spiral-shaped conductors 48 on the visible surface of the armature disc assembly 41. Similar conductors (not shown) are located on the other side of the disc assembly 41. Annular outer slip rings 55 and annular inner slip rings 56 are of copper and electrically connected, one of each, to each separate conductor 48. Outer slip ring brushes 57, and inner slip ring brushes 58 are electrically insulated from, but supported and attached to field element 40a of the homopolar electrical generator 40, which support is not shown.

Figure 9:
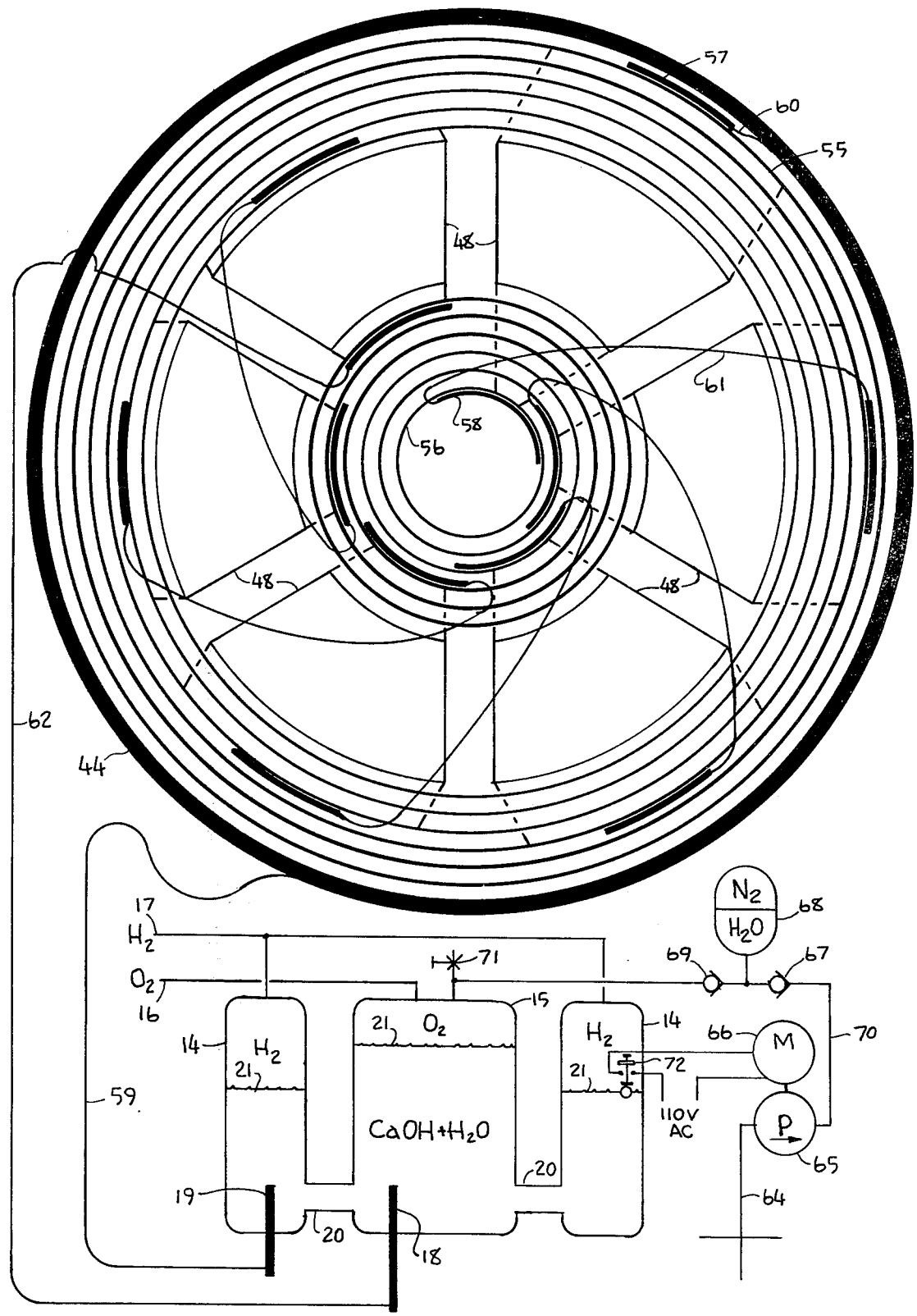
FIG. 9 is a schematic diagram of the homopolar generator wiring plus plumbing and control devices for the electrolysis cells.

Referring now to the electrical schematic of FIG. 9. One continuing circuit exists from cathode 19 in hydrogen bottle 14, through a conductor 59 which leads from cathode 19, to field coil 44, then through a number of turns in field coil 44, then from field coil 44 through conductor 60 to outer slip ring brush 57, which is in contact with annular outer slip ring 55, then through conductor 48, to annular inner slip ring 56, and to inner slip ring brush 58. From this particular inner slip ring brush 58 thence through conductor 61 to the next outer slip ring brush 57 in series fashion through the plurality of conductors 48 arranged on one side of the armature disc assembly 41, until all of the conductors 48 have been connected in series, and from the last such inner slip ring brush 58 through conductor 62 to anode 18 in oxygen drum 15. This electrical path is duplicated for the opposite side of the disc assembly 41, and in like manner for all the homopolar electrical generators 40 and electrolysis cells arrayed on the same structure.

Figure 8:
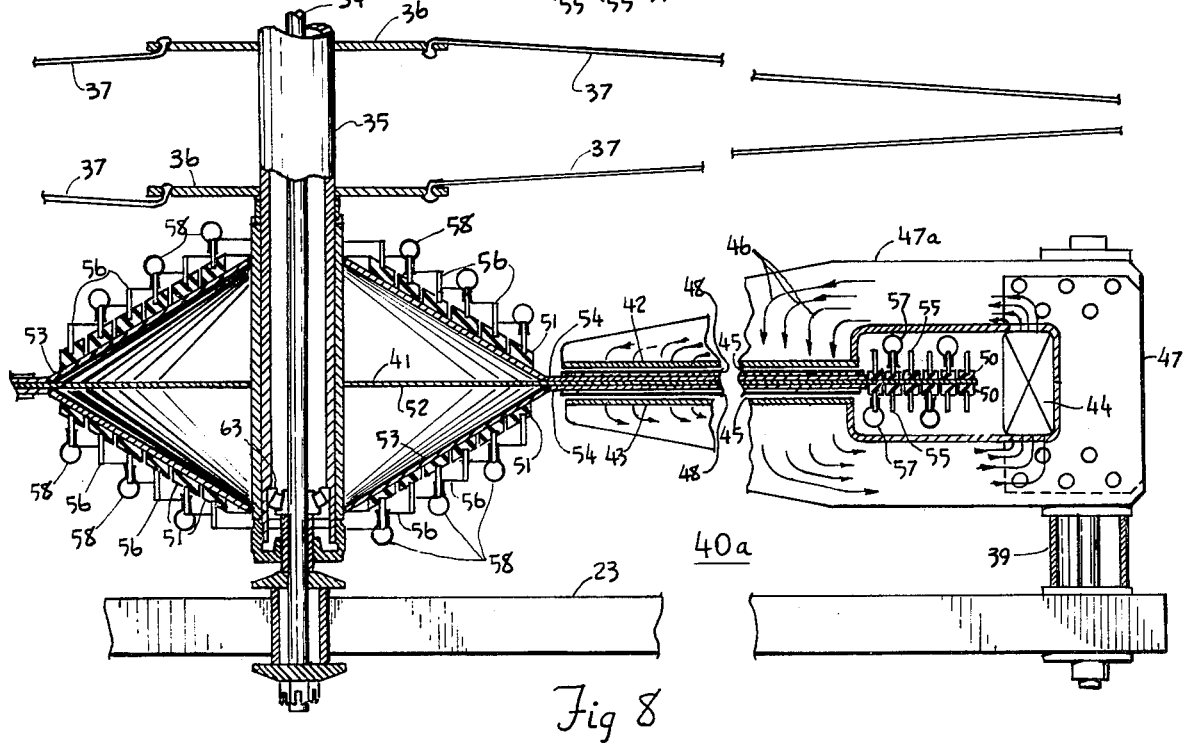
FIG. 8 is a partial sectional view taken along the axis of rotation of one of the homopolar generators of FIG. 1.

Referring again to FIG. 8, bearing 63 supports tube 35 on axis of rotation shaft 34, at both ends of the shaft 34, so that both ends of shaft 34 are supported by support arm assemblies 23.

Referring now to FIG. 9, line 64 is a system water inlet, leading from a well or other source (not shown), to water pump 65, to high pressure line 70 leading to an upstream check valve 67, then to an accumulator 68, which maintains the desired gas output pressure by subjecting the water in the system to the pressure of the nitrogen gas charge on the opposite side of the accumulator diaphragm, through the downstream check valve 69, and from there to the oxygen drum 15. Fill valve 71 is used to exclude air from the system, and float switch 72 makes or breaks an electrical circuit that energizes electric motor 66, which drives the pump 65 to maintain the water level in the electrolysis cells as water is consumed by the gas generating process.

In operation, the wind driven elements 25 of this invention may be acted upon by winds of nearly any speed, blowing from any direction at any constancy, from steady to gusting. As the wind rotates the wind driven elements 25 at either a steady or varying rate of speed, the wind driven element 25 rotates the disc assembly 41 within the field element 40a of the homopolar electrical generator 40. The steel disc poles 42 and 43 are separated from the rotating disc assembly 41 by air gaps 45, thereby allowing disc assembly 41 to rotate within the stationary field element 40a without mechanical interference. The poles 42 and 43 are made of steel and are permanent magnets, having oppositely poled magnetic attraction for each other, and could therefore serve as field elements of the homopolar electrical generator 40, even without the effect of field coil 44. However, field coil 44 adds to the strength of the magnetic poles 42 and 43, and maintains the output of the homopolar electrical generator 40.

Since magnetic lines of force 46 bridge the air gaps 45 separating poles 42 and 43, a current is induced in the spiral-shaped and radially and arranged conductors 48 which travel in a path normal to magnetic lines of force 46. The current is induced in the conductors 48 at a potential varying directly with the speed the conductors 48 travel through the magnetic lines of force 46.

As soon as the speed of the conductors 48 is great enough to produce a potential great enough to overcome the electrical resistance of the electrolyte 21, the induced current will flow through the electrolyte 21. As the speed of the conductors 48 increases, the potential increases. Since the amperage remains fairly constant, an increase in potential varies directly with the power produced by the homopolar electrical generator 40. The electrolyte 21 constitutes a nearly infinite number of electrically conducting paths within itself, and is thus capable of accepting the increase in potential as the number of electrical paths is increased by the speed of the wind. The amounts of the gases hydrogen and oxygen produced by the gas generator in unit time also varies directly with the speed of the wind. It follows, then, that if a varying rate of production of hydrogen and oxygen is acceptable, no other regulatory devices are necessary, other than that of windspeed. Further, it also follows that simple storage of the energy converted into hydrogen and oxygen will allow consumption of the energy at any rate and time desired, and reasonably, by virtue of the pressure at which the gases are stored, at nearly any place, as well, given only that the quantity produced of the gases exceeds or equals the demand.

As the force, duration, and direction of the wind in any given position is a variable, so is demand. The invention herein disclosed provides a means of increasing or decreasing gas generating capacity to suit varying demands. The basic unit includes one main support structure comprised of legs 10, upper braces 11 and lower braces 12, one support arm assembly 23, one wind driven element 25 with two homopolar electrical generators 40, one central oxygen drum 15, and one satellite hydrogen bottle 14, plus additional peripheral equipment such as pumps 65, motors 66, valves 67, 69 and 71 as desired according to the degree of automation wanted. By adding support arm assemblies 23, wind driven elements 25, homopolar electrical generators 40, and satellite hydrogen bottles 14 to the basic unit, the same wind that drives the basic unit will also create additional hydrogen and oxygen gases to suit the demand level anticipated without the additional expense and space required for another entire unit.

It will be readily apparent to those skilled in the art that, with but slight modifications to the preferred embodiment described wind driven gas generators such as herein described, can be fully automated and connected together in a gathering field consisting of as many producers as desired, as remote from population centers as desired, and even arranged along a transmission pipeline to maintain system pressure within the pipeline.

I claim:

1. A wind driven gas generator comprised of a wind driven element rotating about a vertical rotational axis which is supported in a fixed position by a support structure, a homopolar direct current generator having a stationery field element and a rotating disc assembly, the rotating disc assembly being mounted on the vertical rotational axis of the wind driven element, conductors mounted on the rotating disc assembly, the conductors terminating in slip rings at both the inner and outer edge of the rotating disc assembly, the stationery field element comprised of two disc-shaped poles having fins, a field coil housing connecting the disc-shaped poles annularly at the outer edge of the disc-shaped poles, an annular field coil contained in the field coil housing, the electrical output of the homopolar direct current generator connected to a cathode and anode in an electrolysis cell.

2. The wind driven gas generator of claim 1, the wind driven element comprised of a pair of annular rims supported by spokes connected to the vertical rotational axis, a plurality of vanes having unbalanced areas and being mounted on pivots that are connected between the rims, a plurality of stops supported by the spokes and mounted parallel to the vertical rotational axis in proximity to the vanes so as to form a reactive member against which wind pressure is converted to rotational energy by the vanes.

3. A wind driven gas generator comprised of a support structure having a plurality of support arm assemblies, a plurality of wind driven elements rotating about a vertical rotational axis, each vertical rotational axis being supported in a fixed position between the support arm assemblies, a plurality of homopolar direct current generators energized by each of the wind driven elements, the electrical output of the homopolar direct current generators energized by a single wind driven element connected to a cathode and anode in an electrolysis cell, each homopolar direct current generator having a stationery field and a rotating disc assembly, the rotating disc assembly of a pair of the homopolar direct current generators being mounted on the rotational axis of one of the wind driven elements between the support arm assemblies, the rotating disc assembly having conductors on both sides thereof, the conductors having a spiral shape terminating in slip rings at both the inner and outer edges of the rotating disc assemblies, the stationery field elements each comprised of two disc-shaped poles having fins, a field coil housing connecting the disc-shaped poles annularly at the outer edge of the disc-shaped poles and an annular field coil contained in the field coil housing.

4. The wind driven gas generator of claim 3, the electrolysis cells being comprised of a central drum containing a plurality of anodes and a series of bottles surrounding the drum, the bottles each containing a cathode, a passage connecting each of the bottles to the central drum and the electrolysis cells containing water plus a salt as an electrolyte so as to form hydrogen and oxygen.

5. The wind driven gas generator of claim 4, each wind driven element comprised of a pair of annular rims supported by spokes connected to the vertical rotational axis, a plurality of vanes having unbalanced areas and being mounted on pivots that are connected between the rims, a plurality of stops supported by the spokes and mounted parallel to the vertical rotational axis in proximity to the vanes so as to form a reactive member against which wind pressure is converted to rotational energy by the vanes.

6. The wind driven gas generator of claim 3, each wind driven element composed of a pair of annular rims supported by spokes connected to the vertical rotational axis, a plurality of vanes having unbalanced areas and being mounted on pivots that are connected between the rims, a plurality of stops supported by the spokes and mounted parallel to the vertical rotational axis in proximity to the vanes so as to form a reactive member against which wind pressure is converted to rotational energy by the vanes.

* * * * *